Patented Dec. 15, 1953

2,662,882

UNITED STATES PATENT OFFICE 2,662,882

PROCESS OF PREPARING A HYDROPHILIC COLLOID

George Christianson, Minneapolis, and Paul E. Ramstad, St. Paul, Minn., assignors to General Mills, Inc., a corporation of Delaware No Drawing. Application August 9, 1947, Serial No. 767,844

6 Claims. (Cl. 260—209.5)

The present invention relates to a free-flowing hydrophilic colloid and to a process of preparing such a product.

Hydrophilic colloids, particularly vegetable gums such as guar, locust bean gum, gum tragacanth, gum karaya, and other materials such as pectin, are most commonly used as aqueous dispersions. These colloids are, however, extremely difficult to disperse and if particles of any relatively large size are employed, they merely swell and require excessive agitation and long periods of time before a homogeneous dispersion is obtained. To overcome this difficulty it has been the custom to reduce these materials to the form of fine particles. This is for the purpose of enabling the individual particles to hydrate in a short period of time and thus producing a uniform dispersion. Finely divided hydrophilic colloid materials, however, were found not to disperse readily since when material is added to water, a quantity of it becomes coated with a jelly-like layer on the outside as a result of the rapid hydration of the outside particles. This jelly-like layer prevents the penetration of moisture to the inside, and accordingly the inside remains dry and does not hydrate. In order to overcome this difficulty, it has been necessary to employ excessively rapid agitation.

It has now been found possible to produce a product which not only makes possible rapid dispersion, but at the same time eliminates the necessity for excessively rapid agitation. This is accomplished by producing hydrophilic colloids in the form of agglomerates of finely divided particles. Thus the agglomerates are of sufficient size as to eliminate the tendency for the formation of a jelly-like layer surrounding numerous agglomerates, and at the same time the individual agglomerates are of a sufficiently porous or discontinuous nature that it is possible for the water to penetrate the agglomerates and to cause them to disintegrate into small particles, each of which is completely surrounded by water.

It is, therefore, an object of the present invention to provide a novel hydrophilic colloid product composed of an agglomerate of finely divided gum particles such that the agglomerate is readily dispersible in water without excessive agitation.

It is another object of the present invention to provide a novel vegetable gum product composed of an agglomerate of finely divided gum particles such that the agglomerate is readily dispersible in water without excessive agitation.

It is another object of the present invention to provide a process of producing such products.

While the present invention is applicable to hydrophilic colloids in general, it is particularly applicable to vegetable gums and will be described with particular reference thereto.

As was pointed out above, the present invention involves a product which is composed of an agglomerate of finely divided particles of vegetable gum. The original continuous structure of the vegetable gum in its natural form has been destroyed by reducing the gum to fine particles. New, but weaker, bonds between individual gum particles are created to produce an agglomerate which will maintain its shape in the dry condition, and which will withstand reasonable mechanical handling. However, when these agglomerates are immersed in water, the weak bonds are destroyed by the action of the water to liberate the individual finely divided gum particles in a completely wet condition, such that they can readily hydrate and become uniformly dispersed.

This product may be produced in the following manner: Water is added to a suitably finely ground gum to raise the moisture content to one suitable for the agglomeration step. In general, it has been found that moisture contents within the approximate range of 30–60% are suitable for this purpose. The moist gum is then agitated or stirred until the moisture is uniformly distributed, at which time the gum takes the form of large clumps of material in the form of a more or less damp mixture. This damp mixture is then suitably reduced to the size of the ultimately desired agglomerates. The size of the agglomerates will depend to some extent on the properties desired for the product and the use to which the product is to be put. In general it has been found that a product which when dry will pass a 40-mesh Tyler standard sieve and be retained on an 80-mesh sieve is satisfactory. Material which is too fine may be re-worked to produce particles of the desired size. If too coarse, it may be ground to desired size. It has been found that when the agglomerates are reduced such that they will pass a 60-mesh sieve and be retained on a 100-mesh sieve, that somewhat more agitation is required in order to produce a smooth dispersion in water. However, under these circumstances, the speed of hydration is increased. On the other hand, if the size of the particles is increased such that they will not pass a 40-mesh sieve, less agitation will be required in order to effect dispersion without clumping. Under these circumstances, however, somewhat more time will be required. While it is desirable that the product be composed substantially entirely of agglomerates of the above mentioned particle size, the presence of a small amount of fines is not detrimental, inasmuch as the presence of the large quantity of agglomerates tends to keep the fines separated, and thus eliminate the possibility of the fines clumping together when mixed with water.

While the moisture content within the range 30–60% is desirable in most instances, moisture contents as low as 20% may be employed, provided the equipment employed exerts sufficient pressure to form the agglomerates. Thus, for example, if the material is subjected to pressure, as for example, where the material is passed through a screw conveyor, less moisture is necessary to produce the desired agglomeration than is the case where less forceful methods of agitation are employed. Usually the lower the amount of water employed in producing the agglomerates, the weaker and more easily broken will be the agglomerates. On the other hand, where larger quantities of water are employed, the mechanical strength of the agglomerates is increased, but longer periods of time are required to hydrate the particles and break the bonds which hold these agglomerates together.

The following examples will serve to illustrate the invention:

Example 1

One thousand grams of water were added to 2,000 grams of guar gum; the guar gum was in the form of a flour-like material secured from the endosperm of guar seeds which had been ground to small enough particles so they would pass a 13 XX bolting cloth (which is similar in size to a 130 wire sieve). This mixture of guar gum and water was stirred in a Hobart mixer until homogeneous, which usually required about 3 to 5 minutes. Less stirring time may result in incomplete mixing, while more time may cause the mixture to become exceedingly warm.

This homogeneous mixture was then ground in a hammermill having sieve openings about 0.5 mm. in diameter. The product discharged from the hammermill was slightly rubbery, yet not sticky. It may at times be desirable to pass this rubbery-like material through the mill a second time if the product discharged is not homogeneous after the first pass, although a second pass is seldom necessary.

The ground moist gum was then spread out, about one inch thick, on a table top in a room of normal or lower humidity at room temperature. Drying is usually accomplished in 12–16 hours, although this will vary with the humidity in the room. After 12–16 hours, the gum had dried to a hard solid product. During the drying, the product shrinks somewhat, such that most of the material which originally went through a one-half mm. screen in the wet condition, would pass through a 40-mesh wire screen in the dry condition.

This product could be dispersed in water in almost any proportion. Dilute sols such as 2% sols were made by simply adding the requisite amount of gum to water and agitating gently. The product is also capable of making much more concentrated sols, even up to 20%. In the preparation of such sols, the required amount of gum is added to water and the mixture agitated to produce homogeneity. At these higher concentrations the gum would hydrate and the material set up to a solid mass which was not flowable.

In addition to these properties, the dried gum in this condition is free-flowing as distinguished from the flour-like characteristics of the finely divided gum. This property is of value in the processing of the gum and also in many applications of the gum.

Example 2

Tara gum was used in exactly the same manner as the guar gum of Example 1, and the product was produced having substantially the same properties.

Example 3

Example 1 was carried out exactly as above described except that locust bean gum was used. The product obtained was substantially the same as that produced in Example 1.

Example 4

Finely divided guar gum in the amount of two parts was added to one part of water and the mixture manually stirred for a time insufficient to effect homogeneous distribution of the moisture. This mixture was passed twice through a Wiley mill using a sieve with 1 mm. openings and then finally through the same mill using a sieve with one-half mm. openings. The product was then dried in much the manner described in Example 1 to produce a similar product.

Example 5

This example demonstrates the extreme fineness of the material which may be employed in this process. To one part of water was added one part of extremely finely divided product obtained from a stocking dust collector used in the grinding of tara gum. (This material was of such a degree of fineness that it could not be classified on standard screens but would require some method of air separation to determine particle size.) The moist mixture thus obtained was then passed through flaking rolls, after which the flaked material was passed through a hammermill as described in Example 1 and was then dried. The product thus obtained hydrated very readily without any difficulty being encountered with clumping.

Example 6

One part of water was added to two parts of finely divided gum tragacanth and the mixture was agitated in a Waring blendor for 10 minutes. The product thus obtained was dried at room temperature and then sifted. Particles passing through a 20-mesh screen and retained on an 80-mesh screen were suitable for immediate use. The particles which passed over the 20-mesh screen were ground to produce the desired particle size, while the material which passed through the 80-mesh screen was re-worked with water to produce the desired size particles. This product was then ready for use and had the desirable properties of the materials mentioned herein.

Example 7

Example 6 was repeated employing gum karaya instead of gum tragacanth and the results obtained were very similar.

Example 8

150 g. of pectin (of particle size passing a 9 xx bolting cloth) was mixed with 25 ml. of water in a Waring blendor. The mixture was then air-dried. After sifting, it was found that the material which would pass a 20-mesh wire sieve and be retained on an 80-mesh wire sieve could be more easily dispersed in water than could the original product.

While the invention has been described with particular reference to certain gums and certain details of processing, it is to be understood that the same is not limited thereto. In general, the invention is applicable to the class of gums known as galactomannans and glucomannans, such as locust bean, guar, flame tree, honey locust, palo verde, tara, Cassia occidentalis, as well as the gums known as the pathological exudates, such as tragacanth, karaya, sassa, arabic, etc. As was pointed out previously, the invention is applicable to hydrophilic colloids in general, including pectin and similar materials. It is to be understood that the invention is not limited to the specific embodiments described, but may be varied within the scope of the following claims.

We claim as our invention:

1. Process of preparing a hydrophilic colloid product which comprises adjusting the moisture content of a finely divided hydrophilic colloid material selected from the group consisting of vegetable gums and pectin to within the approximate range of 20–60%, agitating the mixture to agglomerate the finely divided material into agglomerates composed of numerous particles loosely held together, converting said agglomerates into agglomerates ranging in size from approximately 20-mesh to approximately 100-mesh and drying said sized agglomerates.

2. Process of preparing a vegetable gum product which comprises adjusting the moisture content of a vegetable gum to within the approximate range of 20–60%, agitating the mixture to agglomerate the finely divided material into agglomerates composed of numerous particles loosely held together, converting said agglomerates into agglomerates ranging in size from approximately 20-mesh to approximately 100-mesh and drying said sized agglomerates.

3. Process of preparing a vegetable gum product which comprises adjusting the moisture content of a vegetable gum to within the approximate range of 30–60%, agitating the mixture to agglomerate the finely divided material into agglomerates composed of numerous particles loosely held together, converting said agglomerates into agglomerates ranging in size from approximately 20-mesh to approximately 100-mesh and drying said sized agglomerates.

4. Process of producing a vegetable gum product which comprises adding moisture to a finely divided vegetable gum material to increase its moisture content to within the approximate range of 30–60%, agitating the mixture to produce a damp plastic mass, subjecting said mass to impact, forcing the material through a screen having openings not substantially larger than ½ mm. to produce agglomerates composed of numerous particles loosely held together and drying said agglomerates.

5. Process of preparing a galactomannan gum product which comprises adding moisture to a finely divided galactomannan gum product to increase its moisture content to within the approximate range of 30–60%, agitating the mixture to produce a damp plastic mass, subjecting said mass to impact, forcing the material through a screen having openings not substantially larger than ½ mm. to produce agglomerates composed of numerous particles loosely held together and drying said agglomerates.

6. Process of preparing a glucomannan gum product which comprises adding moisture to a finely divided glucomannan gum product to increase its moisture content to within the approximate range of 30–60%, agitating the mixture to produce a damp plastic mass, subjecting said mass to impact, forcing the material through a screen having openings not substantially larger than ½ mm. to produce agglomerates composed of numerous particles loosely held together and drying said agglomerates.

GEORGE CHRISTIANSON.
PAUL E. RAMSTAD.

References Cited in the file of this patent

UNITED STATES PATENTS

| Number | Name | Date |
|---|---|---|
| 1,928,135 | Peebles et al. | Sept. 26, 1933 |
| 2,016,592 | Chuck | Oct. 8, 1935 |
| 2,221,552 | Nicholson | Nov. 12, 1940 |
| 2,376,656 | Buchanan | May 22, 1945 |
| 2,508,533 | Olsen | May 23, 1950 |

OTHER REFERENCES

Millard, "Physical Chemistry for Colleges," Sixth Ed. 1946, page 568.